(12) United States Patent
Liang et al.

(10) Patent No.: US 10,185,489 B2
(45) Date of Patent: Jan. 22, 2019

(54) OPERATION METHOD FOR ELECTRONIC APPARATUS

(71) Applicant: Wistron Corporation, New Taipei (TW)

(72) Inventors: Chen-Yi Liang, New Taipei (TW); Cheng-Hsiang Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 89 days.

(21) Appl. No.: 14/174,856

(22) Filed: Feb. 7, 2014

(65) Prior Publication Data

US 2015/0106919 A1   Apr. 16, 2015

(30) Foreign Application Priority Data

Oct. 15, 2013   (TW) .............................. 102137153 A

(51) Int. Cl.
   *G06F 3/0488* (2013.01)
   *G06F 21/36* (2013.01)

(52) U.S. Cl.
   CPC .......... *G06F 3/04883* (2013.01); *G06F 21/36* (2013.01)

(58) Field of Classification Search
   CPC ........................... G06F 21/316; G06F 3/04883
   See application file for complete search history.

(56) References Cited

U.S. PATENT DOCUMENTS

| | | | | |
|---|---|---|---|---|
| 8,595,823 | B2 * | 11/2013 | Hayland | G06F 21/52 709/229 |
| 2007/0013672 | A1 * | 1/2007 | Shim | G06F 3/04886 345/173 |
| 2009/0165121 | A1 * | 6/2009 | Kumar | G06F 21/316 726/19 |
| 2010/0328338 | A1 * | 12/2010 | Kim | F21V 23/0442 345/589 |
| 2011/0141052 | A1 | 6/2011 | Bernstein et al. | |

(Continued)

FOREIGN PATENT DOCUMENTS

| | | |
|---|---|---|
| CN | 101916166 | 12/2010 |
| CN | 202012029 | 10/2011 |

(Continued)

OTHER PUBLICATIONS

"Office Action of Taiwan Counterpart Application," dated Jun. 4, 2015, with English translation thereof, p. 1-p. 12.

(Continued)

*Primary Examiner* — Carl G Colin
*Assistant Examiner* — Vance M Little
(74) *Attorney, Agent, or Firm* — JCIPRNET

(57) ABSTRACT

An operation method for an electronic apparatus is provided. The method includes: providing a setting function interface to be displayed on a display unit; detecting a motion trajectory operated on the display unit by a user using an input unit; performing an association setting to associate the motion trajectory with an operation function; making an original executing manner for executing the operation function unenforceable; and executing the corresponding operation function accordingly when an operation matching the motion trajectory is detected.

12 Claims, 3 Drawing Sheets

(56) References Cited

U.S. PATENT DOCUMENTS

| | | | | |
|---|---|---|---|---|
| 2011/0246952 A1* | 10/2011 | Tsao | ................... | G06F 3/04883 |
| | | | | 715/863 |
| 2011/0265045 A1* | 10/2011 | Hsieh | ................. | G06F 3/04883 |
| | | | | 715/863 |
| 2013/0111551 A1* | 5/2013 | Dellacona | ............... | G06F 21/60 |
| | | | | 726/3 |
| 2013/0154919 A1* | 6/2013 | Tan | ........................ | G01S 15/50 |
| | | | | 345/156 |
| 2013/0162519 A1* | 6/2013 | Ameling | ............... | G06F 3/0488 |
| | | | | 345/156 |
| 2013/0227418 A1* | 8/2013 | Sa | ....................... | G06F 3/04883 |
| | | | | 715/728 |
| 2014/0189603 A1* | 7/2014 | Adams | ................ | G06F 3/04883 |
| | | | | 715/863 |
| 2014/0372896 A1* | 12/2014 | Raman | ................. | G06F 3/0488 |
| | | | | 715/741 |

FOREIGN PATENT DOCUMENTS

| | | | | |
|---|---|---|---|---|
| CN | 102467336 | | 5/2012 | |
| CN | 102750105 | | 10/2012 | |
| CN | 103092517 | | 5/2013 | |
| EP | 2381384 A1 | * | 10/2011 | ............. G06F 3/016 |
| TW | 201135567 | | 10/2011 | |
| TW | 201137658 | | 11/2011 | |

OTHER PUBLICATIONS

"Office Action of China Counterpart Application," dated Mar. 29, 2017, with English translation thereof, p. 1-p. 12.

"Office Action of China Counterpart Application," with partial English translation thereof, dated Aug. 31, 2017, p. 1-p. 16.

\* cited by examiner

OPERATION METHOD FOR ELECTRONIC APPARATUS

CROSS-REFERENCE TO RELATED APPLICATION

This application claims the priority benefit of Taiwan application serial no. 102137153, filed on Oct. 15, 2013. The entirety of the above-mentioned patent application is hereby incorporated by reference herein and made a part of this specification.

BACKGROUND OF THE INVENTION

Field of the Invention

The invention relates an operation method for an electronic apparatus, and more particularly, to an operation method for an electronic apparatus having an encryption function.

Description of Related Art

With improvement in technology, a computing capability of an electronic apparatus such as a smart phone or a tablet computer is continuously improved. Basically, the computing capability of current mobile electronic apparatus is now capable of satisfying various demands for a user. When the user intends to access a document or execute a function, time is usually wasted in searching menus and switching between pages until a desired page is found, so that documents, functions or commands may then be located in said page. For instance, it is assumed that the user intends to use a camera of the smart phone as an example, function such as taking a photo can only be performed after the following steps: unlocking a locked screen, searching and tapping on a desired software icon in a user interface on a touch screen, and waiting until a software is started.

In order to simplify above-said steps, various methods have been proposed provided in conventional art. For instance, by setting a common function as a shortcut icon, and have the shortcut icon disposed on a desktop of the touch screen, so that the user may located a desired software more intuitively Or, a physical button may be disposed on the mobile electronic apparatus, so that a corresponding software may be directly started by using the physical button.

However, if there is too many of the short icons being disposed on the desktop, the user may still waste a lot of time in searching for the desired software. Furthermore, based on a design concept for the current mobile electronic apparatus, it is less likely to have too many of the physical buttons disposed on the mobile electronic apparatus. Moreover, a function for the user to customize a software corresponding to the physical button is not always provided by manufacturers of the mobile apparatus.

SUMMARY OF THE INVENTION

The invention is directed to an operation method for an electronic apparatus, capable of customizedly setting a motion trajectory as a substitution for starting a corresponding operation function.

In the operation method for the electronic apparatus of the invention, the electronic apparatus includes an input unit, a display unit and a display unit, and the operation method includes: providing a setting function interface to be displayed on a display unit; detecting a motion trajectory operated on the display unit by a user using the input unit; performing an association setting to associate the motion trajectory with an operation function of the electronic apparatus; making at least one original executing manner for executing the operation function unenforceable by the electronic apparatus; and executing the operation function associated with the motion trajectory accordingly when an operation matching the motion trajectory is detected.

In an embodiment of the invention, the step of detecting the motion trajectory operated on the display unit by the user using the input unit further includes: detecting a pressure value operated on the display unit by the user using the input unit; and performing the association setting to associate the motion trajectory and the pressure value with the operation function. In addition, the step of detecting the pressure value operated on the display unit by the user using the input unit further includes: displaying the pressure value by using a light emitting unit.

In an embodiment of the invention, the step of making the original executing manner unenforceable includes: deleting an original executing path of the operation function associated and executed by the electronic apparatus; or moving a content stored in a preset folder to a designated folder, in which the content is one of a command, a shortcut and an executive file originally used by the electronic apparatus for executing the operation function. Further, the operation method further includes: determining whether to recover the original executing manner for executing the operation function; and moving the content of the designated folder back to the preset folder when it is determined to recover the original executing manner for executing the operation function.

In an embodiment of the invention, the step of making the original executing manner unenforceable includes: modifying a property of an executing object corresponding to the original executing manner to disable. The executing object is one of a menu option, a hotkey and an assembly key originally used by the electronic apparatus for executing the operation function. Further, the operation method further includes: determining whether to recover the original executing manner for executing the operation function; and modifying a property of an executing object corresponding to the original executing manner to enable when it is determined to recover the original executing manner for executing the operation function.

In an embodiment of the invention, after the motion trajectory is associated with the operation, the operation method further includes: prompting a password setting message for receiving a setting password. Further, the operation method further includes: determining whether to recover the original executing manner for executing the operation function; prompting a password entering message for receiving a verification password when it is determined to recover the original executing manner for executing the operation function; comparing the verification password with the setting password; and making the original executing manner enforceable when the verification password matches the setting password.

In an embodiment of the invention, the operation method includes: displaying a prompt message on the display unit by the setting function interface, so as to prompt the user to operate the motion trajectory in a preset region of the display unit. In addition, a touch panel is provided as the input unit for detecting the motion trajectory operated is a touch operation generated by the user using at least one of fingers or a stylus.

In summary, the original executing manner of the operation function may be made unenforceable by customizedly setting the motion trajectory for starting the corresponding operation function. As a result, it can prevent the operation function form being accessed by others, thereby improving the encryption function.

To make the above features and advantages of the disclosure more comprehensible, several embodiments accompanied with drawings are described in detail as follows.

DESCRIPTION OF THE EMBODIMENTS

Figure 1:
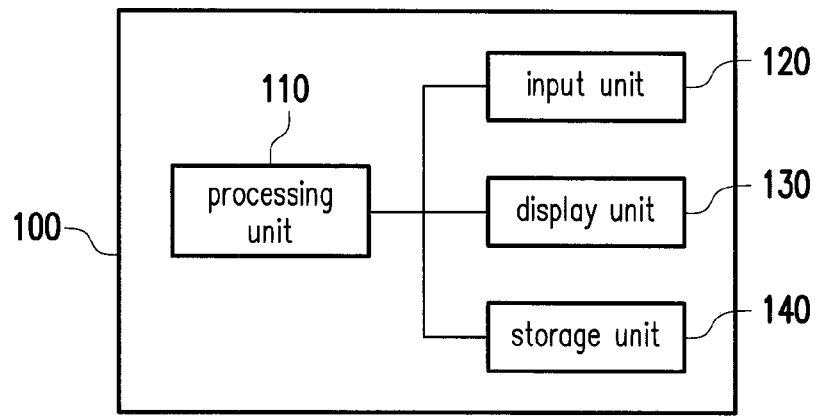
FIG. 1 is a schematic diagram of an electronic apparatus according to an embodiment of the invention.

FIG. 1 is a schematic diagram of an electronic apparatus according to an embodiment of the invention. Referring to FIG. 1, an electronic apparatus 100 is, for example, a cell phone, a smart phone, a tablet computer, a personal computer and so on, which includes a processing unit 110, an input unit 120, a display unit 130 and a storage unit 140. The processing unit 110 is coupled to the input unit 120, the display unit 130 and the storage unit 140.

The processing unit 110 is, for example, a central processing unit (CPU), or other programmable microprocessors. The display unit 130 is, for example, any display capable of displaying a graphical user interface such as a liquid crystal display (LCD), an organic light-emitting display, a plasma display, an electronic paper.

The input unit 120 is, for example, any device capable of operating the graphical user interface displayed by the display unit 130 such as a touch panel, a trackpad, a mouse a trackball, a trackpoint. The touch panel may be implemented by various touch sensing technologies such as a resistive type, a capacitive type, an optical type, an acoustic wave type, an electromagnetic type, or a hybrid type including any two of above, but the invention is not limited thereto. Further, in case the input unit 120 is the touch panel of above-mentioned type, the input unit 120 may be integrated with the display unit 130 as a touch display.

The input unit 120 is configured to detect a touch operation performed on the touch panel or the trackpad by a user using a finger or a stylus, or to detect a movement operation operating by the user using the mouse, the trackball, the trackpoint. Accordingly, the input 120 reports a message such as related positions, movement information back to the processing unit 110 for generating a corresponding operating point on the display unit 130. For the touch panel and the trackpad, the operating point is a touch point, whereas for the mouse, the trackball and the trackpoint, the operating point is a cursor.

The storage unit 140 is, for example, a random access memory (RAM), a read-only memory (ROM), a flash memory, or a magnetic disk storage device. A plurality of program code segments are stored in the storage unit 140. The program code segments may be executed by the processing unit 110 after being installed. The program code segments include a plurality of commands, and the operation method is executed by the processing unit 110 using the commands. In the present embodiment, the electronic apparatus 1100 only includes one processing unit 110. In other embodiments, the electronic apparatus 110 may also includes a plurality of the processing units 110, and the program code segments being installed may be executed by said processing units.

Figure 2:
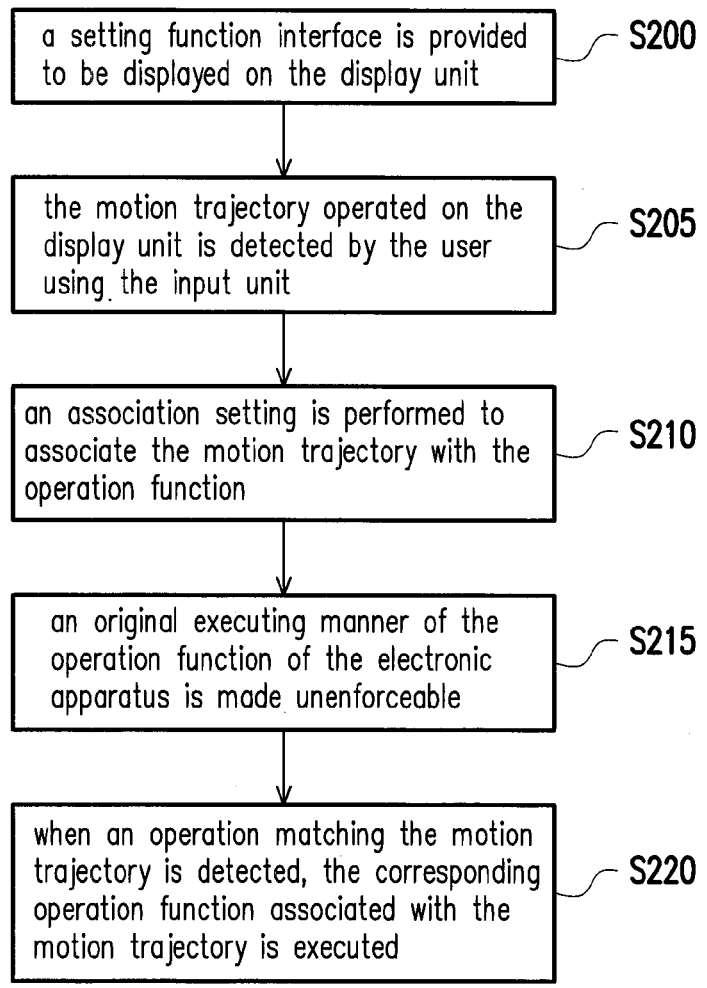
FIG. 2 is a flowchart of an operation method for an electronic apparatus according to an embodiment of the invention.

Steps of an operation flow are described below with reference to the electronic apparatus 100. FIG. 2 is a flowchart of an operation method for an electronic apparatus according to an embodiment of the invention. The operating method of the present embodiment is adapted to the electronic apparatus 100, and the input unit 120 is, for example, the touch panel, the trackpad, the mouse, the trackball or the trackpoint, but the invention is not limited thereto.

In step S200, a setting function interface is provided for the user to start setting a motion trajectory. The setting function interface may be a trajectory setting application stored in the storage unit 140 and executed by the processing unit 110, so as to be displayed on the display unit 130. After the user selects and starts the trajectory setting application by using the input unit 120, a prompt message such as a prompt message block or a prompt message text is displayed on the display unit 130, so as to notify the user to start setting the motion trajectory in the prompt message block or a preset region.

In step S205, the processing unit 110 detects the motion trajectory operated on the display unit 130 by the user using the input unit 120. Herein, the processing unit 110 may record the motion trajectory, and even record a drawing sequence or a shape of the motion trajectory. Accordingly, the input 120 reports the message such as related positions, movement information based on an operated status thereof back to the processing unit 110, so as to generate the corresponding operating point on the display unit 130. In case the input unit 120 is the trackpad, the user may perform the touch operation on the input unit 120 by using the finger or the stylus, so as to draw the motion trajectory on the display unit 130. In case the input unit 120 is the mouse, the user may move the mouse to operate the cursor on the display unit 130, so as to draw the motion trajectory.

After the motion trajectory is obtained, in step S210, the user may perform a selecting setting to associate the motion trajectory with an operation function of the electronic apparatus 100, and the processing unit 110 may then perform an association setting to associate the motion trajectory with the operation function according to the selecting setting. In addition, after the motion trajectory is detected, and before the association setting is performed, the processing unit 100 may further execute any one of following actions: displaying a prompt message block on the display unit 131 to notify the user to input the same motion trajectory; and displaying the motion trajectory obtained on the display unit 130 for the user to confirm. The operation function is, for example, starting applications, opening documents/files and so on.

Figure 3A:
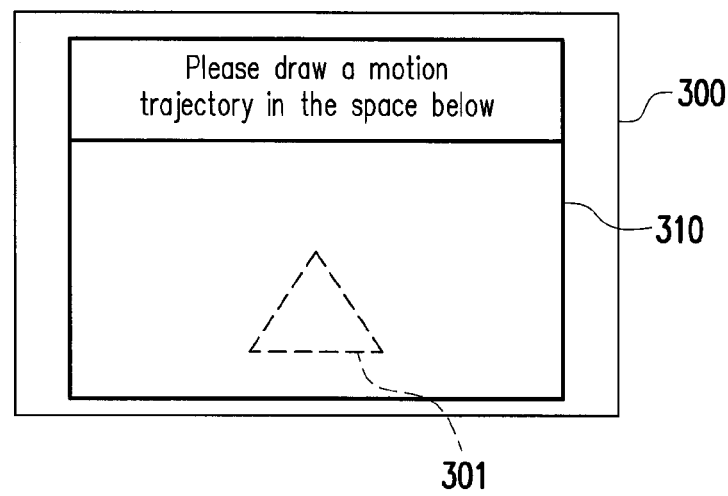
FIG. 3A to FIG. 3C are schematic diagrams of a displayed screen of an associating setting according to an embodiment of the invention.
Figure 3B:
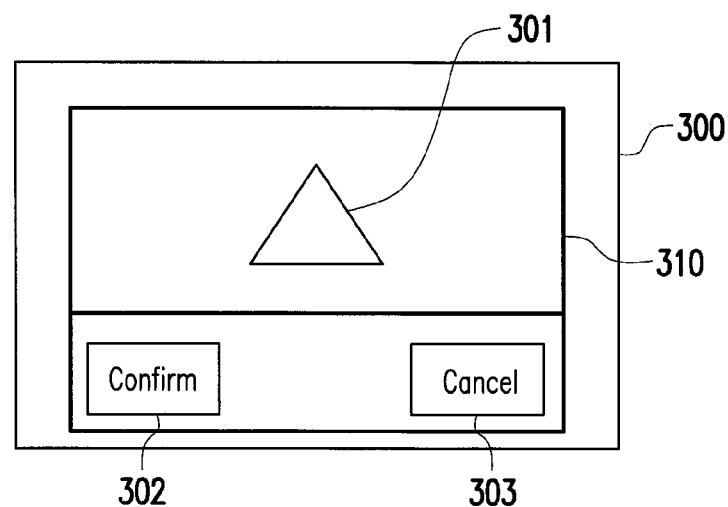
Figure 3C:
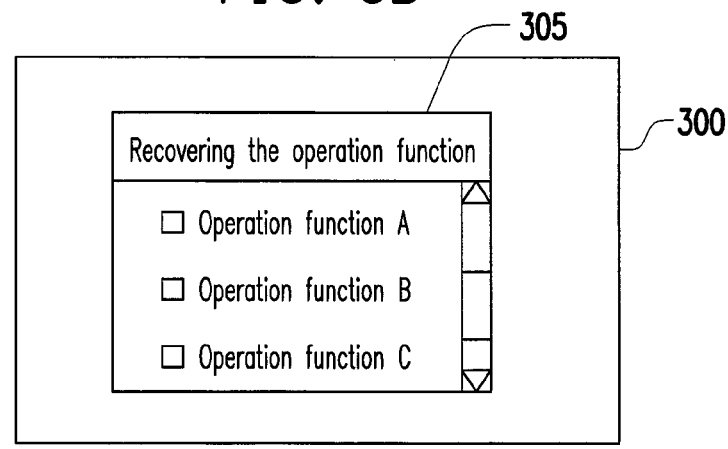

For the convenience of the description, the operation method of the electronic apparatus is described with reference to the schematic diagrams. FIG. 3A to FIG. 3C are schematic diagrams of a displayed screen of an associating setting according to an embodiment of the invention. FIG. 3A to FIG. 3C illustrates a displayed screen 300 of the display unit 110.

In FIG. 3A, when the user starts the setting function interface so that a prompt message block 310 is displayed on the displayed screen 300 of the display unit 130, the user may draw a motion trajectory 301 in the prompt message block 310 by using the input unit 120. Herein, the motion trajectory 301 is illustrated in dash lines to indicate that the motion trajectory 301 is not displayed in the displayed screen 300 during the processing of drawing. In other embodiments, the motion trajectory 301 may also be displayed in the displayed screen 300, and the invention is not limited thereto.

After the user completes drawing of the motion trajectory 301 (i.e., the motion trajectory is detected by the processing unit 110), the motion trajectory 301 previously inputted may be further displayed in the prompt message block 310 for the user to confirm, as shown in FIG. 3B. Meanwhile, the processing unit 110 may also display a confirm function key 302 and a cancel function key 303 in the prompt message block 310. The operation flow is terminated once the user triggers, presses, or clicks the cancel function key 303. When the user triggers, presses, or clicks the confirm function key 302, an operation function menu 305 (including operation functions A to C) is displayed on the displayed screen 300, for the user to select the operation function to be associated, as shown in FIG. 3C.

Thereafter, in step S215, the processing unit 110 makes an original executing manner of the operation function selected and associated by the user in previous step unenforceable.

Methods for making the operation function unenforceable may include a plurality of implementations. For instance, an original executing path for executing the operation function may be directly deleted by, for example, deleting a shortcut icon (configured to be clicked or pressed to start the operation function) provided on a desktop of the display unit 130 of the electronic apparatus 100. Or, a menu of the operation function originally stored in a file manager program menu may be deleted, such that the corresponding operation function cannot be executed by the original executing manner.

Alternatively, in case a preset folder is stored under the original executing path of the operation function, a content including a command, a shortcut or an executive file for executing the operation function is stored in the preset folder. After the motion trajectory is associated with the operation function, the content stored in the present folder is moved to a designated folder. The designated folder may be a folder established somewhere else, or a recycle bin for temporally storing data being deleted. In other words, said method only moves related files for executing the operation function indicated by the original executing path to somewhere else instead of deleting the original executing path, so that the corresponding operation function cannot be executed by the original executing path. In addition, the content of the preset folder may be further encrypted and compressed before being stored in the designated folder.

Moreover, the operation function may include an executing object including a corresponding icon, a menu option, a hotkey or an assembly key, and the processing unit 110 may modify a property of the executing object to disable (e.g., a display status is modified to be hidden, inactivated or unusable), so as to disable the executing object from executing the operation function. For instance, the property "0" indicates "disable", and the property "1" indicates "enable". The processing unit 110 modifies the property of the operation function to "0" once the association setting is performed by the user on the operation function.

Further, for security matters, after the association setting is performed to associate the motion trajectory with the operation function, a setting password may further be established for the motion trajectory. The setting password is configured to ensure that the motion trajectory being set cannot be easily altered or changed by the others. More specifically, the processing unit 110 may further prompt a password setting message for receiving a setting password. For instance, a password setting interface may be displayed on the display unit 130, so that the user may set the setting password in the password setting interface. Furthermore, the user may also select a bootup password in the password setting interface to serve as the setting password.

After the association setting is performed to associate the motion trajectory with the operation function, in step S220, when the processing unit 110 detects an operation matching the motion trajectory, the corresponding operation function associated with the motion trajectory is executed.

In addition, in step S205 described above, the processing unit 110 may further detect a pressure value sensed by the input unit 120, such that both the motion trajectory and the pressure value may be associated with the operation function. For instance, a pressure sensor is disposed in the input unit 120, so that the pressure value may be sensed by the pressure sensor, and reported back to the processing unit 110. Herein, the electronic apparatus 100 may further display the pressure value detected by using a light emitting unit (not illustrated herein). For instance, in case colors are used to represent ranges for different pressure values, one color may represent a pressure value range, so that the pressure value currently detected may be known by the current color currently being displayed. The light emitting unit is, for example, a light emitting diode (LED). Or, a color block may be directly displayed on the display unit 130, and the colors block may be changed according to changes in the pressure value. In addition, the pressure value corresponding to each stroke being completed may also be recorded. Herein, one motion trajectory may correspond to one pressure value, or one stroke in the motion trajectory may correspond to one pressure value.

Accordingly, when the processing unit 110 detects another operation of the motion trajectory subsequently, besides determining whether the operation matching the motion trajectory being set, whether the pressure value of the operation matches the pressure value corresponding to the motion trajectory being set is also determined. In order to tolerate minor errors, when the operation matching the motion trajectory is detected in subsequent process, it is determined as matched as long as the pressure value falls within a tolerance range. Accordingly, in step S220 described above, the corresponding operation function is executed only when the operation matching the motion trajectory is detected.

Figure 4:
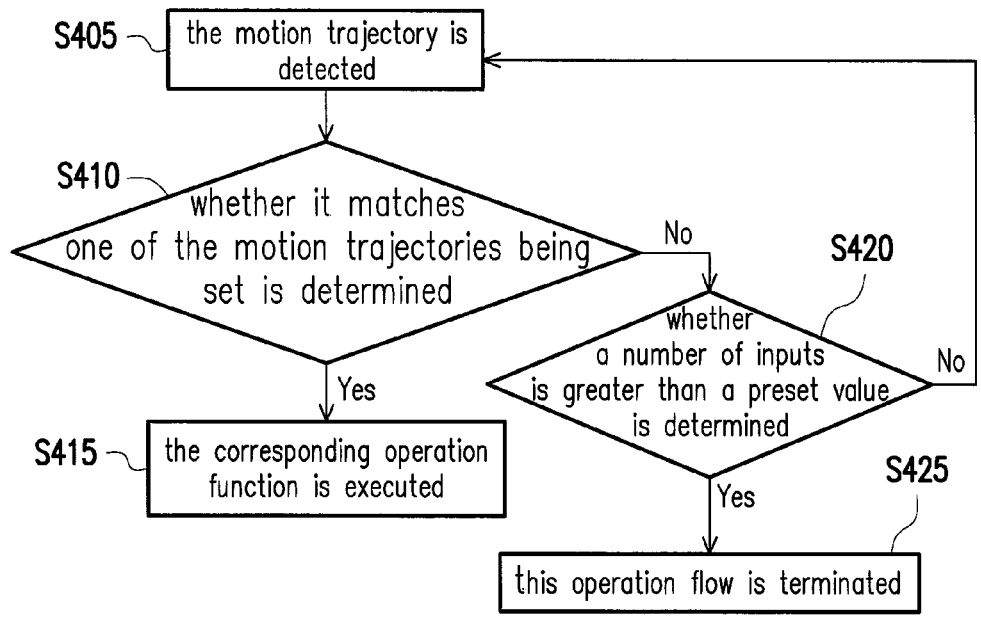
FIG. 4 is a flowchart for executing the operation function according to an embodiment of the invention.

The operation flow for executing the operation function is described below in detail with references. FIG. 4 is a flowchart for executing the operation function according to an embodiment of the invention. In the present embodiment, at least one association setting to associate the motion trajectory with an operation function is completed.

Referring to FIG. 1 and FIG. 4, in step S405, the processing unit 110 detects the motion trajectory operated on the display unit 130 by the user using the input unit 120. Next, in step S410, the processing unit 110 compares whether the motion trajectory currently detected matches one of the motion trajectories being set. If the motion trajectory currently detected matches the motion trajectory being set, the processing unit 110 executes the corresponding operation function in step S415. If the motion trajectory currently detected does not match the motion trajectory being set, the processing unit 110 determines whether a number of inputs is greater than a preset value (e.g., three times) in step S420. If the number of inputs is greater than three times, the operation flow is terminated as shown in step S425. If the number of inputs is less than or equal to three times, the number of inputs is added by one, and step S405 is repeatedly executed.

Description below is made with reference to a smart phone having a touch screen as an example. A motion trajectory of "Δ" and "+" is drawn on the touch screen, and such motion trajectory is associated with a camera function. When the motion trajectory of "Δ" and "+" is drawn on the touch screen by the user later, the camera function may be directly executed. Furthermore, a motion trajectory of "3" may also be drawn on the touch screen, and such motion trajectory is associated with an operation function of "turning current page to the right for three pages". Thereafter, when the motion trajectory of "3" is drawn on the touch screen by the user later, a content of a third page to the right is displayed on the display unit 130.

In the operation method as described above, the processing unit 110 may further determine whether to recover the original executing manner for executing the operation function (e.g., whether to start a recovering process), so as to recover the original executing manner of the operation function. Another example is provided below for further description.

Figure 5:
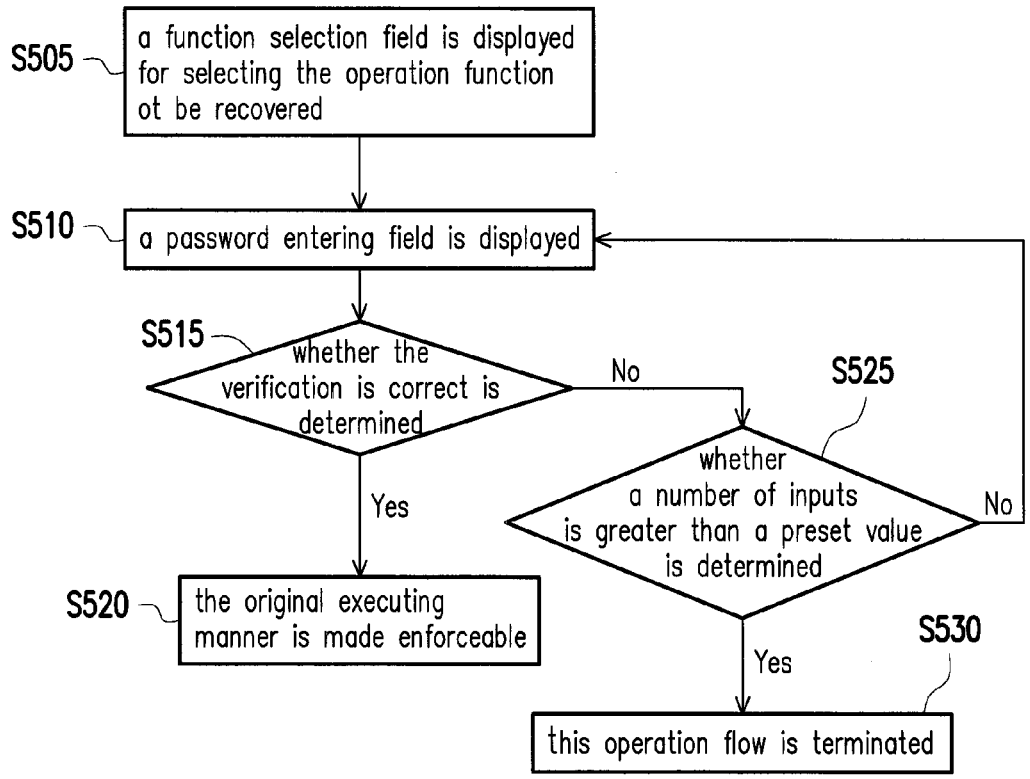
FIG. 5 is a flowchart of the recovering process for the original executing manner according to an embodiment of the invention.

FIG. 5 is a flowchart of the recovering process for the original executing manner according to an embodiment of the invention. In the present embodiment, one setting password is set during the association setting to associate the motion trajectory with the operation function. Further, a recover interface is established in the electronic apparatus 110 in advance for the user to recover the original executing manner of the operation function through the recover interface. Once the user starts the recover interface, the recovering process as described below is then triggered.

Referring to FIG. 1 and FIG. 5 together, in step S505, a function selection field is displayed on the display unit 130 for the user to select the operation function intended to be recovered. Herein, for the operation function already associated with one motion trajectory among the operation functions included in the function selection field, the original executing manner is already unenforceable.

Once one among the operation functions is selected by the user, in step S510, a password entering field is displayed on the display unit 130, and the processing unit 110 further prompts a password entering message for receiving a verification password.

Next, in step S515, the processing unit 110 determines whether the verification password is correct, namely, the verification password is compared with the setting password. When the verification password matches the setting password, the processing unit 110 makes the original executing manner enforceable in step S520. For instance, the processing unit 110 moves the content of the designated folder to the preset folder. In case the content stored in the designated folder is encrypted and compressed, the processing unit 110 may decrypt and decompress the content of the designated folder according to the password for encryption and compression before moving the content to the preset folder. Or, the processing unit 110 may modify the property of the executing object corresponding to the operation function to enable, for example, modifying the property to "1".

On the other hand, in case the verification does not match the setting password, in step S525, the processing unit 110 determines whether the number of inputs is greater than the preset value (e.g., three times). If the number of inputs is greater than three times, the operation flow is terminated as shown in step S530. If the number of inputs is less than or equal to three times, the number of inputs is added by one, and step S510 is repeatedly executed.

Based on above, in the foregoing embodiments, various different motion trajectories are set as corresponding to different operation functions, respectively. Accordingly, the different motion trajectories may serve as substitutions for executing the different operation function rapidly, so as to save the operating time and electric power. In addition, because other executing manners for the operation are already unenforceable (e.g., deleting or hiding the path for starting the operation function), the corresponding operation function can only be executed when a correct motion trajectory is detected, thus an encryption function may be provided accordingly.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An operation method for an electronic apparatus, wherein the electronic apparatus comprises an input unit and a display unit, and the method comprising:
   providing a setting function interface to be displayed on a display unit;
   receiving a trajectory on the setting function interface through the input unit;
   selecting an operation function of the electronic apparatus on the setting function interface to associate the motion trajectory with the operation function; and
   setting the associated motion trajectory to execute the selected operation function on the electronic apparatus, replacing all other means of executing the selected operation function with the associated motion trajectory;
   wherein the selected operation function was originally executed by an icon, a menu option, a hotkey or an assembly key before the associated motion trajectory is set as the only way for executing the operation function, and the selected operation function is unable to be executed by the icon, the menu option, the hotkey and the assembly key after the associated motion trajectory is set as the only way for executing the operation function.

2. The operation method of claim 1, wherein the step of receiving the motion trajectory on the setting function interface through the input unit further comprises:
   detecting a pressure value operated on the display unit by a user using the input unit;
   wherein the step of selecting the operation function of the electronic apparatus on the setting function interface to associate the motion trajectory with the operation function comprises:
   associating the motion trajectory and the pressure value with the operation function.

3. The operation method of claim 2, wherein the step of detecting the pressure value operated on the display unit by the user using the input unit comprises:
   displaying the pressure value by using a light emitting unit.

4. The operation method of claim 1, wherein the step of setting the associated motion trajectory as the only way for executing the selected operation function on the electronic apparatus comprises:

deleting an original executing path of the selected operation function associated and executed by the electronic apparatus.

5. The operation method of claim 1, wherein the step of setting the associated motion trajectory as the only way for executing the selected operation function on the electronic apparatus comprises:

moving a content stored in a preset folder to a designated folder, wherein the content is one of a command, a shortcut and an executive file originally used by the electronic apparatus for executing the selected operation function.

6. The operation method of claim 5, further comprising:

moving the content of the designated folder back to the preset folder when it is determined to recover the icon, the menu option, the hotkey or the assembly key from being unable to execute the selected operation function.

7. The operation method of claim 1, wherein the step of setting the associated motion trajectory as the only way for executing the selected operation function on the electronic apparatus comprises:

modifying a property of the icon, the menu option, the hotkey or the assembly key to disable.

8. The operation method of claim 7, further comprising:

modifying the property of the icon, the menu option, the hotkey or the assembly key to enable when it is determined to recover the icon, the menu option, the hotkey or the assembly key from being unable to execute the selected operation function.

9. The operation method of claim 1, wherein after the step of selecting the operation function of the electronic apparatus on the setting function interface to associate the motion trajectory with the operation function, the operation method further comprises:

prompting a password setting message for receiving a setting password.

10. The operation method of claim 9, further comprising:

prompting a password entering message for receiving a verification password; and when the verification password matches the setting password, recovering the icon, the menu option, the hotkey or the assembly key from being unable to execute the selected operation function.

11. The operation method of claim 1, further comprising:

displaying a prompt message on the display unit by the setting function interface, so as to prompt a user to operate the motion trajectory in a preset region of the display unit.

12. The operation method of claim 1, further comprising:

providing a touch panel as the input unit for detecting the motion trajectory operated in a touch operation generated by a user using at least one of fingers or a stylus.

* * * * *